Feb. 17, 1931.  E. P. LARSH  1,792,645
ARMATURE BEARING FOR ELECTRIC MOTORS
Filed Dec. 6, 1921
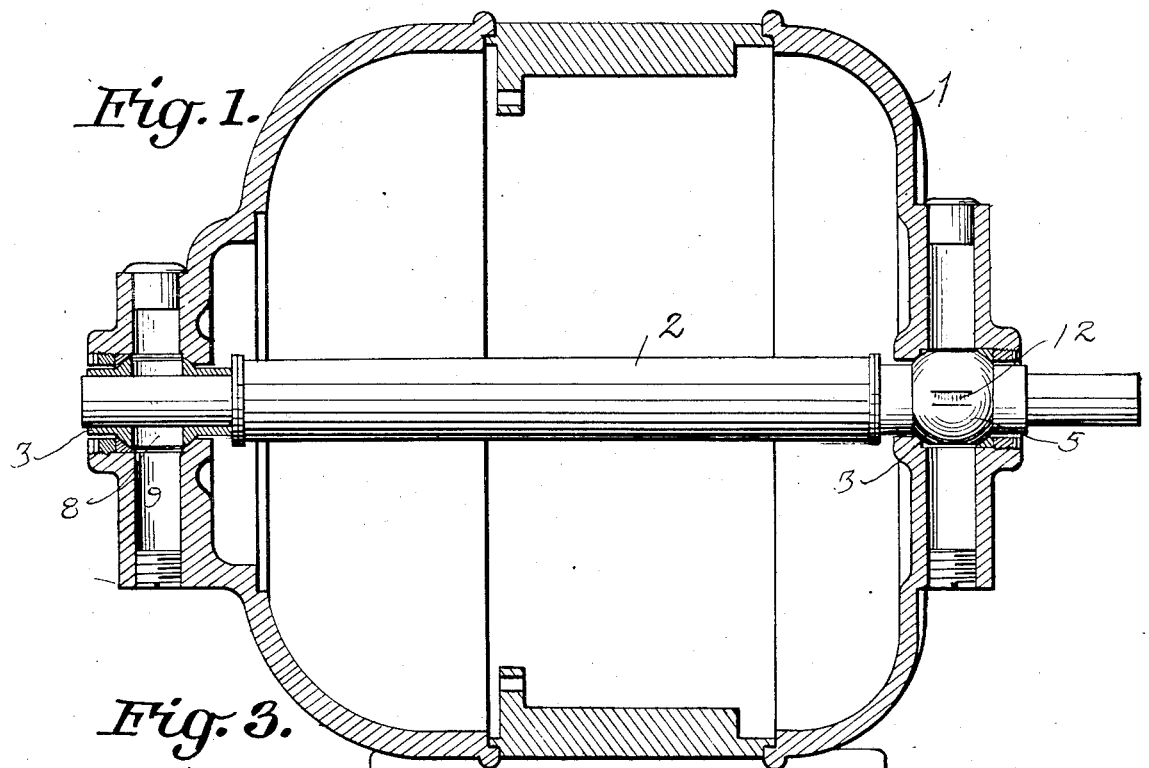
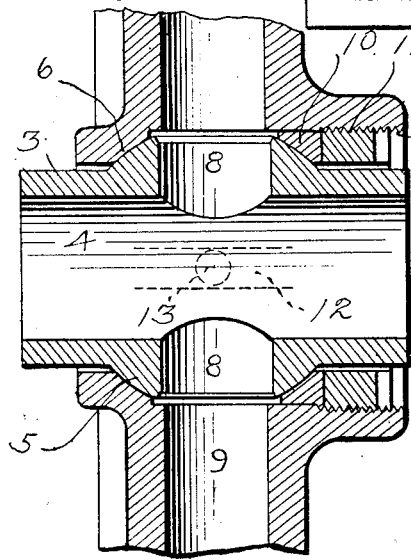
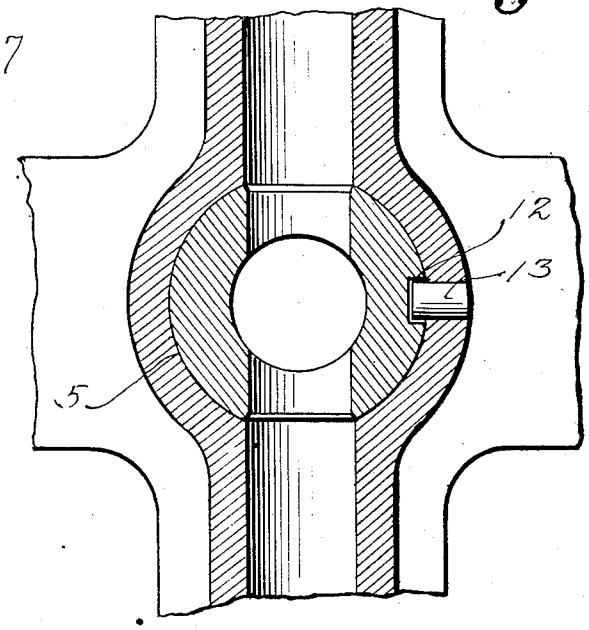
INVENTOR.
Everett P Larsh
BY F. L. Walker
ATTORNEY.

Patented Feb. 17, 1931

1,792,645

UNITED STATES PATENT OFFICE

EVERETT P. LARSH, OF DAYTON, OHIO, ASSIGNOR TO THE MASTER ELECTRIC COMPANY, OF DAYTON, OHIO, A CORPORATION OF OHIO

ARMATURE BEARING FOR ELECTRIC MOTORS

Application filed December 6, 1921. Serial No. 520,341.

My invention relates to improvements in self alining bearings, which are particularly adapted for electric motors of the small or fractional horse type, but which may also find a wide field of usefulness in other arts.

The object of the invention is to simplify the structure as well as the means and mode of operation of such devices whereby they will not only be cheapened in construction, but will be more efficient in use, uniform in action, capable of standardized production, economical to manufacture, and easily installed.

A further object of the invention is to provide a bearing particularly adapted for armature shafts of electric motors, which will obviate the inaccuracies resulting from the necessity of reaming widely separated or spaced bearing sleeves or bushings.

In the usual construction, it is the practice to provide a bearing sleeve or bushing in each head of the motor frame to receive the ends of the armature shaft. It is of course the aim and desire that these bearing sleeves or bushings be positioned in absolute axial alinement one with the other. However, under ordinary manufacturing conditions absolute accuracy in this respect is rarely achieved. It is the practice after having positioned the bearing to pass a reamer thru one bushing and thence thru the other with the intent to ream these holes in absolute alinement. However, in many instances, the result is to distort the bore of the bushing or sleeve from a circular to an oval or elliptical opening due to any inclination of the original axis of the hole to the axis of the reaming tool. This causes the armature shaft to bear ununiformly and unevenly, materially reducing the bearing surface and causing great inefficiency. Not only are the bores of the respective bushings distorted, due to slight inclination to the axis of the reamer, but being spaced a considerable distance apart, there will be some vibration or chatter in the reamer, which is necessarily unsupported between the bearings, which will result in further distortion and irregularity of the bore of the respective sleeves.

One of the objects of the present invention is to overcome this difficulty by providing a simple, economical but efficient bearing sleeve or bushing which will have a limited range of universal adjustment by which it is enabled to automatically aline itself with the armature shaft and with the companion bearing.

With the above primary and other incidental objects in view as will more fully appear in the specification, the invention consists of the features of construction, the parts and combinations thereof, and the mode of operation, or their equivalents as hereinafter described and set forth in the claims.

Referring to the drawings, Fig. 1 is a vertical sectional view of an electric motor frame, showing therein the armature shaft mounted in the universally adjustable bearing sleeve or bushing forming the subject matter hereof.

Fig. 2 is an enlarged detail sectional view on line 2—2 of Fig. 3, illustrating one of the bearing sleeves or bushings and the mounting therefor.

Fig. 3 is a transverse sectional view on line 3—3 of Fig. 2, of the bushing and its mounting.

Like parts are indicated by similar characters of reference thruout the several views.

Referring to the drawings, 1 is a motor frame and 2 the armature shaft having journal bearings in the head of the frame 1. The ends of the armature shaft 2 are journalled in bearing sleeves or bushings 3, each comprising an elongated cylindrical sleeve, having therein a bore 4, accurately proportioned to agree with the diameter of the bearing portion of the armature shaft. About the exterior of the cylindrical sleeve or bushing there is formed a spheroidal zone or band 5. The heads of the motor frame or other structure are counterbored to receive these bearing sleeves or bushings, the shoulder or offset 6 of the counter-bores or sockets are arcuate to agree with the contour of the spheroidal band or zone 5 of the bushing. The outer portion of the counter-bore or socket in the supporting structure is screw threaded as at 7. The bearing sleeve or bushing preferably is provided with a transverse opening 8, which regardless of variations of adjustment of the sleeve registers with the lubricant reservoir 9 formed in the head of the motor frame or supporting structure. This transverse opening, however, may be omitted if so desired, and other form of lubrication provided. The bearing sleeve is inserted within the counter-bored socket or opening in the supporting frame and a follower or collar 10 is inserted therein, the shape of which is concave, with the same degree of spherical formation as the spheroidal band of the bearing sleeve. The bearing sleeve and collar are held in adjusted relation within the counter-bored socket by a screw threaded adjusting ring 11, screw threaded into the outer end of the counter-bored recess. The spheroidal band of the bearing sleeve is thus engaged between the spheroidal concavity of the shoulder 6 within the receiving socket and the spheroidal concavity of the follower or collar 10. The peripheral convex band or zone is slotted or grooved at one side as at 12 to receive a stud or pin 13, stationarily mounted in the supporting frame or structure and projecting within the socket recess in a position alined with the center of the spheroidal band on an axis at right angles to the axis of the bearing sleeve. The engagement of this stud or pin 13 within the groove 12 prevents the rotation of the bearing sleeve within the recess or socket, but being on the transverse axis of the convex medial zone, it in no way interferes with the tilting or universal movement of the sleeve within its socket. The sleeve is thus enabled to assume various positions by tilting in vertical, horizontal or inclined planes which may be necessary to bring the respective sleeves of the pair into absolute axial alinement, and to enable the sleeve to conform with the trunnions of the armature shaft. It is recognized that adjustable journal bearings are not new in the art per se, but that in the present instance, the form and mounting of the journal bearing sleeve, shaped to enable standardized production and easy and quick assembly by persons unskilled in the art of alining spaced bearings. Further the construction heretofore described, affords a simple economical but efficient mounting, for such adjustable bearings, which permit it a free range of universal adjustment within such limits as would ordinarily be required to meet even abnormal conditions of manufacture.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features it is to be understood that the invention is not limited to the specific details shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. In a self aligning shaft bearing, a bearing sleeve including a spheroidal portion having therein an axially disposed bore and a diametrically disposed transverse bore, said bores intersecting at the center of the spheroidal portion, the first of which is to receive a shaft and the other of which is to supply lubricant thereto, said spheroidal portion having in its external face a groove extending at right angle to the lubricant bore and on level with and parallel to the axis of the shaft receiving bore, a mounting having a spheroidal socket therein to receive the mounting, and a stud carried by the mounting and projecting into the said groove of the bearing in axial alignment with the geometrical center of the spherical portion and perpendicular to the lubricant receiving bore and normally perpendicular to the axis of the shaft receiving bore, said bearing sleeve being capable of rocking movement about the axis of the lubricant receiving bore and also in the plane thereof about the axis of said stud but incapable of rotary motion about the axis of the shaft receiving bore.

2. In a self aligning shaft bearing, a bearing member having a spheroidal exterior surface and having a longitudinal bore and a diametrical bore therethrough intersecting each other, a groove in the spheroidal surface disposed in the plane of the axis of said longitudinal bore and extending substantially parallel therewith, a mounting having therein a spheroidal socket receiving the spheroidal portion of the bearing member, a stud carried by the mounting projecting into the groove, the axis of which is aligned with the geometrical center of the spheroidal portion of the bearing member and in the normal position of the bearing at right angle thereto, said bearing member being capable of rocking movement within the socket about the axis of said stud and also about the axis of the transverse bore perpendicular to the axis of the stud during which latter motion the grooved portion of the bearing moves to and fro past the stud.

3. In an adjustable shaft mounting, a bearing sleeve having a spherical exterior bearing surface, a mounting therefor having a socket to receive the spherical portion of said bearing sleeve, said sleeve having an axial bore affording a bearing for a shaft, and having a transverse bore intersecting the axial bore, said mounting having therein a bore to receive lubricant with which the transverse bore of the bearing sleeve registers, a longitudinally disposed slot in the external spherical surface of the bearing sleeve, and a stud projecting from the interior wall of the socket into said slot, said sleeve being capable of axial tilting movement concentric with the axis of said stud and also in the plane of the axis of said stud and in various intermediate planes of axial oscillation, but maintained by said stud with its transverse bore in approximate registry with the bore of the mounting and against rotary motion about its axis.

In testimony whereof, I have hereunto set my hand this 22nd day of November, A. D. 1921.

EVERETT P. LARSH.